United States Patent [19] [11] 3,961,532
Kukuruzinski [45] June 8, 1976

[54] DISPOSABLE CLINICAL THERMOMETER

[76] Inventor: Raymond Kukuruzinski, 88 Clinton Place, Hackensack, N.J. 07601

[22] Filed: Oct. 29, 1975

[21] Appl. No.: 626,762

Related U.S. Application Data

[63] Continuation-in-part of Ser. No. 563,789, March 31, 1975, abandoned.

[52] U.S. Cl. .................................................. 73/371
[51] Int. Cl.² .......................... G01K 5/10; G01K 5/22
[58] Field of Search ............................... 73/371, 374

[56] References Cited
UNITED STATES PATENTS

| | | |
|---|---|---|
| 2,413,959 | 1/1947 | Eisele .................................. 73/371 |
| 2,447,888 | 8/1948 | Young .................................. 73/371 |
| 2,706,761 | 4/1955 | Douglas ............................. 73/371 X |
| 3,469,451 | 9/1969 | Eizenberg ............................. 73/371 |
| 3,631,721 | 1/1972 | Nollen ............................... 73/371 X |
| 3,688,582 | 9/1972 | Gradishar ............................ 73/371 |
| 3,745,831 | 7/1973 | Rothstein ............................. 73/371 |
| 3,872,729 | 3/1975 | Ayres .................................. 73/371 |

Primary Examiner—Richard C. Queisser
Assistant Examiner—Frederick Shoon
Attorney, Agent, or Firm—Ralph R. Roberts

[57] ABSTRACT

A disposable clinical thermometer of low cost and preferably mostly of plastic includes a stiff rod-like inner member having a longitudinal groove of like configuration extending its length. A baffle or lip is formed on one end of this rod to provide a restriction to the flow of fluid to the groove. This rod is inserted into a flexible and transparent tube which is a tight fit on the rod-like member. A plastic, rigid, liquid container forms one end of the thermometer and is bonded to the housing at the end which encloses the restriction on the rod. The other end of the outer housing is tightly closed. A colored fluid having a known expansion with the heating of the fluid is placed in the rigid container. This fluid contains a coloring material which as the colored fluid flows up the groove in the rod causes a color to form in the groove, which color remains even if the thermometer is cooled. Indicia showing a temperature range is printed on the outer tube or on adhesive clear tape which is secured to the outer housing.

12 Claims, 5 Drawing Figures

U.S. Patent   June 8, 1976   3,961,532
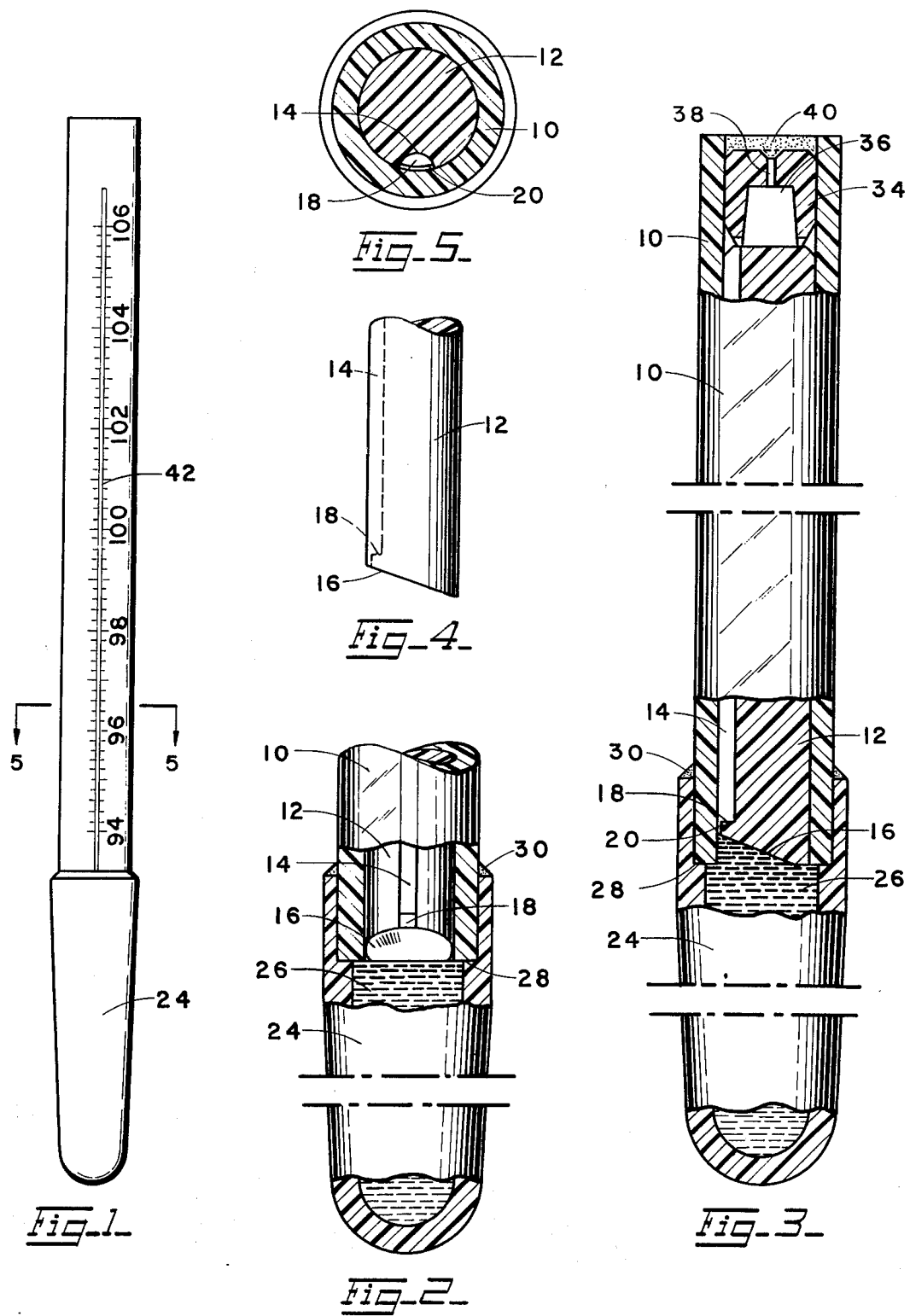

DISPOSABLE CLINICAL THERMOMETER

CROSS REFERENCE TO RELATED APPLICATION

This application is a Contnuation-in-Part of my application Ser. No. 563,789, filed Mar. 31, 1975 and entitled, "Disposable Clinical Thermometers", and now abandoned.

BACKGROUND OF THE INVENTION

1. Field of the Invention

With reference to the classification of art as established in the United States Patent and Trademark Office the present invention is found in the general Class of art entitled, "Measuring and Testing" (Class 73) and more particularly in the subclass entitled, "thermometer-indicating tube-type" (subclass 371).

2. Description of the Prior Art

Thermometers are well known and particularly the clinical thermometer which is constructed of glass with a capillary tube and which uses mercury. This thermometer, of course, is quite expensive and is not a throw-away thermometer. Many attempts to make inexpensive thermometers have been made and in these thermometers the use of non-metallic fluid has been particularly stressed. In many cases the indicating material is a solid until it reaches approximately 90° Fahrenheit at which point it becomes liquid and is moved into a groove formed in a part of the thermometer. Particularly shown with such a device is U.S. Pat. No. 3,688,582 issued Sept. 5, 1972 to GRADISHAR. Another thermometer of this type is seen in U.S. Pat. No. 3,469,451 issued to EIZENBERG on Sept. 30, 1969. Another patent pertaining to the disposable thermometer concept is seen in U.S. Pat. No. 3,487,693 to WEINSTEIN which issued Jan. 6, 1970. Also of note are U.S. Pat. No. 3,745,831 which issued on July 17, 1973 to ROTHSTEIN; U.S. Pat. No. 3,631,721 which issued Jan. 2, 1969 to NOLLEN and U.S. Pat. No. 3,872,729 which issued Mar. 25, 1975 to AYRES. In these and other patents found in the prior art the forming of a capillary tube has been both expensive and lacking in the required accuracy and the resulting product has been less than satisfactory.

A conventional thermometer which is constructed of glass and has a restriction in the capillary tubing is very expensive. When in use over a period of time by several different patients or for several different contagious diseases a thermometer which is unsatisfactorily or improperly cleaned and sterilized provides insufficient protection against transmitting germs from one patient to another in hospital use. In addition to the infection hazard, a broken thermometer and the ingestion of mercury and glass is very undesirable and hazardous. Since the sterilization and the cost of a clinical thermometer constructed of glass and using mercury is expensive, a disposable thermometer costing less than ten cents each to the hospital is both desirable and a time saving convenience unit.

SUMMARY OF THE INVENTION

This invention may be summarized at least in part with reference to its objects.

It is an object of this invention to provide, and it does provide an improvement over the conventional thermometers which have capillary tubes with constrictions and mercury. These thermometers are expensive and for this reason are used for the life of the thermometer.

The thermometer according to the present invention seeks to overcome the above disadvantages by providing a replacement of the capillary tube by a plastic, opaque rod with a longitudinal groove formed in its surface. A small baffle substantially closes this groove at an end of the rod. The above rod including the groove and the baffle is precisely cast or molded. The cross section dimensions of the groove depend on the thermal coefficient of expansion of the liquid and the liquid container capacity. The aforementioned plastic rod is inserted into the plastic, flexible and transparent tubular housing which is bonded permanently to a plastic, rigid container of the thermometer. The inside diameter of the tubular housing is slightly smaller than the rod's diameter allowing the flexible wall of the tubular housing to tightly cover the groove on the rod surface and in this way creates a tightly covered channel. The groove's baffle is approximately 70 percent of the groove deepness and with the cover provides a restrictive opening approximately 0.08 millimeter long and 0.18 millimeter wide. The thermometer's liquid container is also cast or molded precisely from plastic material such as Acrylic, Polyvinyl Chloride (PVC), Cast Nylon, etc. It is bonded or glued permanently to the end of a plastic tubular housing. The thermometer's liquid is an inexpensive fluid such as turpentine darkened by an oil soluble color such as dark blue, deep black, fire red or dark brown.

In addition to the above summary the following disclosure is detailed to insure adequacy and aid in understanding of the invention. This disclosure, however, is not intended to cover each new concept no matter how it may later be disguised by variations in form or additions of further improvements. For this reason there has been chosen a specific embodiment of the clinical thermometer as adopted for a one-time use and showing a preferred means of construction. This specific embodiment has been chosen for the purposes of illustration and description as shown in the accompanying drawing wherein:

BRIEF DESCRIPTION OF THE DRAWING

FIG. 1 represents a front view of the thermometer of this invention in a slightly enlarged scale;

FIG. 2 shows a front sectional view, in enlarged scale and partly fragmentary, of the lower end of the thermometer and showing the fluid container means for retaining the liquid;

FIG. 3 shows a sectional side view, partly fragmentary, of the thermometer and showing the construction and placement of the rod in the outer tubing and the fluid in unexpanded condition.

FIG. 4 represents a side view of the lower portion of the rod member to particularly show the relationship of the groove formed therein and the lip constriction formed on the end, and FIG. 5 represents a sectional view taken on the line 5-5 of FIG. 1, this view shown in an enlarged scale to show the simple construction of the thermometer.

In the following description and in the claims various details are identified by specific names for convenience, these names, however, are intended to be generic in their application. Corresponding reference characters refer to like members throughout the five figures of the drawing.

DESCRIPTION OF THE THERMOMETER

Shown in the Drawing

Referring now to the drawing and FIGS. 1 through 5, it is to be noted that there is shown a thermometer in which an outer tube 10 is transparent and is made of a plastic which preferably is at least slightly flexible and elastic. A rod 12, which may be round or elliptical in shape, is of opaque or at least partially translucent material and may be plastic or metal. This rod is stiff to provide the desired rigidity and has the capability to withstand any compressive force of the elastic tube 10 when it is mounted thereon. Formed in one side of this rod 12 is a groove 14 which may be rectangular or may be semicircular in cross section, as seen in FIG. 5. One end of this rod is preferably formed with a bevel 16 which may be approximately 15° to 30°. This bevel provides an inclined ramp to guide the fluid toward a baffle 18. This baffle 18 does not completely close the access to the groove 14 but instead provides a constriction which, as reduced to practice, is approximately 0.08 millimeter deep and 0.18 millimeter wide. This baffle conventionally is created by upsetting or swaging the end of the rod and is precisely shaped so that a small fluid passageway 0.08 millimeter deep is available at the constriction point. As shown in FIGS. 3 and 5, this constriction passageway is identified as 20.

Attached to the bottom of the tube 10 is a rigid fluid container 24. This container is made of a selected size to enclose and retain a fluid 26 and for a precise mounting of this container on the tube 10 a shoulder 28 is provided. This shoulder 28 engages the end of the tube 10 to form a predetermined reservoir for the fluid 26. This liquid container 24 is fixedly secured to the outer tube 10 by means of an adhesive 30.

The other end of the thermometer tube 10 is closed by a plug 34 which positions and retains the rod 12 within the tube 10. This plug 34 has an air cavity 36 formed therein, which cavity is connected with the groove 14 to provide an air reservoir which permits the fluid, when expanded by heat, to flow up the groove 14. In order to prevent swelling of the tube 10 when the plug is inserted in the end of the tube, there is provided a passageway 38 which permits the plug 34 to be placed in position without distorting the outer sleeve 10 and causing an air pressure to be developed within the thermometer.

This passageway 38 and the plug 34 is retained in position after assembly by means of an adhesive 40. Stamped on the exterior of the outer tube 10, or as an additional member adhesively applied, is indicia 42. This indicia may be applied directly to the tube 10 or may be applied as an adhesive decal.

As reduced to practice, the outer housing is a flexible transparent tube 10 of vinyl, polyethylene or the like. The scale 42 to be read is printed on the outer housing or on a transparent tape having adhesive means for attaching to the housing. A rod 12 of rigid plastic or of metal is conventionally extruded with the longitudinal groove 14 of a very precise size. The cross section of the rod may be round or elliptical. The rod may be of rigid PVC, nylon, acrylic, etc. as long as it is of a precise size and is sufficiently rigid to hold size when the outer tube is mounted thereon. If desired, the rod may be of metal such as aluminum and cut to length with the end swaged to form the bevel and the restriction lip. The outer tubular member may be rigid or substantially so and by cooling the rod and heating the tubular member shrink fit is achieved.

Fluid 26 is merely a matter of selection but with the basic component there is added a coloring material which will have an affinity to the groove surface so that when the colored solution is moved in the groove an accurate recording will be made in the groove even though the cooling of the liquid causes a partial return of the fluid to the container.

A practical size of the thermometer has a rod member approximately ⅛ inch in diameter and 3 inches long. A stretchable tubular outer member may be one-quarter inch O.D. with an I.D. of 0.1181 inch, the length is 3⅜ inches. As the I.D. of the tubing is slightly smaller than the rod a tight fit is achieved and there is no leaking of the fluid as it flows up the groove. The restriction occupies approximately seventy percent of the groove depth. The constriction remaining is about 0.08 millimeter deep and has a width of about 0.18. The fluid container 24 may be of plastic or metal.

Fluid mixtures which are examples of those which may be used include:

Ethyl alcohol and rosin solution including a color soluble in alcohol such as black, navy blue, red, maroon, etc.

Turpentine (oil) including a color soluble in oils with the color being black, blue, red, etc.

Turpentine (oil) and Rosin solution including a color soluble in oils with the color being black, blue, red, etc.

Kerosene including a color soluble in oils with the color being black, blue, red, etc.

Kerosene and Rosin solution including a color soluble in oils with the color being black, blue, red, etc.

Terms such as "left", "right", "up", "down", "bottom", "top", "front", "back", "in", "out" and the like are applicable to the embodiment shown and described in conjunction with the drawing. These terms are merely for the purposes of description and do not necessarily apply to the position in which the disposable clinical thermometer may be constructed or used.

While a particular embodiment of the thermometer has been shown and described it is to be understood the invention is not limited thereto since modification may be made within the scope of the accompanying claims and protection is sought to the broadest extent the prior art allows.

What is claimed is:

1. A disposable clinical thermometer for one-time use, said thermometer including: (a) a rod-like member of regular cross section and at least partially translucent and said rod having a longitudinal groove of regular cross section along its outer surface; (b) a baffle provided at one end of the rod, said baffle substantially closing the end of the groove to provide a constriction while not completely closing the groove; (c) an outer tubular housing of relatively transparent material, this outer housing being a tight fit on the rod and in mounted condition terminating near the baffle end of the rod while extending beyond the other end of the rod; (d) a rigid fluid container sealingly attached to the outer tubular housing at the end adjacent the baffle end of the rod; (e) a closing member secured to the other end of the tubular outer housing to seal this end while providing an expansion chamber connected to the longitudinal groove by which air and the like in the groove may flow from the groove as the groove is filled by fluid; (f) an indicating fluid having a determined coefficient of expansion when heated, said fluid as it expands flowing past the constriction and up the groove an amount commensurate to the amount of heat applied to the fluid container, and (g) indicia applied so as to be viewed from the outside of the thermometer to indicate the degree of heat induced into the fluid container, the indicating fluid having and leaving an indicating color in the groove to indicate the maximum amount of the upward fluid travel.

2. A disposable clinical thermometer as in claim 1 in which the outer tubular housing is sufficiently flexible to enable the rod-like member to be slidably inserted therein.

3. A disposable clinical thermometer as in claim 1 in which the outer tubular housing is substantially rigid and is assembled to the rod-like member by causing the two members to be brought to a temperature differential sufficient for slidable assembly and after the members are brought to the same temperature a shrink fit is achieved.

4. A disposable clinical thermometer as in claim 1 in which the fluid container is a rigid plastic member which is formed with an internal shoulder and against and by which the end of the outer tubular housing is positioned to the fluid container, and in which adhesive is used to secure the fluid container to the outer tubular member.

5. A disposable clinical thermometer as in claim 1 in which the indicia is applied to a transparent decal which is mounted to the outer housing.

6. A disposable clinical thermometer as in claim 1 in which the closing member is a plug having an air receiving cavity formed therein and from this cavity a vent way is provided which enables the plug to be inserted without causing an internal pressure to be formed, the plug and vent after insertion into said outer tubular member being adhesively secured and the vent closed.

7. A disposable clinical thermometer as in claim 1 in which the fluid is ethyl alcohol and rosin solution including a colored substance soluble in alcohol.

8. A disposable clinical thermometer as in claim 1 in which the fluid is turpentine (oil) including a colored substance soluble in oil.

9. A disposable clinical thermometer as in claim 1 in which the fluid is turpentine (oil) and rosin solution including a colored substance soluble in oil.

10. A disposable clinical thermometer as in claim 1 in which the fluid is kerosene including a colored substance soluble in oil.

11. A disposable clinical thermometer as in claim 1 in which the fluid is kerosene and rosin solution including a colored substance soluble in oil.

12. A disposable clinical thermometer as in claim 1 in which the rigid fluid container is of metal.

* * * * *